US011084594B2

(12) United States Patent
Himmelmann

(10) Patent No.: US 11,084,594 B2
(45) Date of Patent: Aug. 10, 2021

(54) HELIUM BASED EMERGENCY POWER AND FIRE SUPPRESSION SYSTEM

(71) Applicant: KIDDE TECHNOLOGIES, INC., Wilson, NC (US)

(72) Inventor: Richard A. Himmelmann, Beloit, WI (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 49 days.

(21) Appl. No.: 15/944,554

(22) Filed: Apr. 3, 2018

(65) Prior Publication Data
US 2019/0300184 A1    Oct. 3, 2019

(51) Int. Cl.
| A62C 3/08 | (2006.01) |
| B64D 25/00 | (2006.01) |
| A62C 35/02 | (2006.01) |
| B64D 41/00 | (2006.01) |
| A62C 99/00 | (2010.01) |
| F01D 15/08 | (2006.01) |
| F01D 15/10 | (2006.01) |

(52) U.S. Cl.
CPC ............... B64D 25/00 (2013.01); A62C 3/08 (2013.01); A62C 35/023 (2013.01); A62C 99/0018 (2013.01); B64D 41/00 (2013.01); F01D 15/08 (2013.01); F01D 15/10 (2013.01)

(58) Field of Classification Search
CPC . F01D 15/08; F01D 15/10; A62C 3/08; A62C 35/023; A62C 99/0018; B64D 25/00; B64D 41/00

USPC ........................................................... 169/46
See application file for complete search history.

(56) References Cited

U.S. PATENT DOCUMENTS

| 2,707,919 A | 5/1955 | Holzwarth |
| 3,746,027 A * | 7/1973 | Elliott .................... F17D 1/14 137/1 |

(Continued)

FOREIGN PATENT DOCUMENTS

CA    1013582    7/1977

OTHER PUBLICATIONS

European Patent Office, European Search Report dated Nov. 11, 2019 in Application No. 19166726.0.
(Continued)

Primary Examiner — Chee-Chong Lee
(74) Attorney, Agent, or Firm — Snell & Wilmer L.L.P.

(57) ABSTRACT

A system includes a turbo pump that converts a compressed gas into power, and a storage tank configured to store the compressed gas. The system also includes a fire suppression control valve configured to be coupled between the storage tank and a cargo compartment of the aircraft and having a closed position in which the compressed gas is prevented from flowing to the cargo compartment and an open position in which the compressed gas flows to the cargo compartment to suppress a fire. The system also includes a pump control valve configured to be coupled between the turbo pump and the storage tank and having a closed position in which the compressed gas is prevented from flowing to the turbo pump and an open position in which the compressed gas flows to the turbo pump to cause the turbo pump to convert the compressed gas into the power.

14 Claims, 3 Drawing Sheets

(56) References Cited

U.S. PATENT DOCUMENTS

| | | | | |
|---|---|---|---|---|
| 3,788,039 | A | * | 1/1974 | Bragg .................... B64D 37/32 |
| | | | | 96/174 |
| 3,847,298 | A | * | 11/1974 | Hamilton ................. B01J 19/14 |
| | | | | 220/88.3 |
| 3,898,998 | A | * | 8/1975 | Billberg ................. B65D 90/44 |
| | | | | 137/113 |
| 4,088,193 | A | * | 5/1978 | Colgate .................... A62C 3/10 |
| | | | | 114/74 A |
| 4,378,920 | A | | 4/1983 | Runnels et al. |
| 6,935,433 | B2 | | 8/2005 | Gupta |
| 8,950,703 | B2 | | 2/2015 | Bayliss et al. |
| 2004/0025507 | A1 | | 2/2004 | Leigh et al. |
| 2017/0211483 | A1 | | 7/2017 | Thiriet et al. |

OTHER PUBLICATIONS

European Patent Office, European Search Report dated Aug. 22, 2019 in Application No. 19166726.0.

\* cited by examiner

HELIUM BASED EMERGENCY POWER AND FIRE SUPPRESSION SYSTEM

FIELD

The present disclosure is directed to systems and methods for providing supplemental power and fire suppression to an aircraft.

BACKGROUND

Conventional aircraft may include a ram air turbine (RAT) that may deploy to provide supplemental power in case the aircraft loses electrical or hydraulic power. RATs may be relatively large and may have a relatively great mass, thus undesirably weighing the aircraft down and utilizing volume within the aircraft that may be used for other purposes.

Conventional aircraft may further include halon fire suppression systems. In response to a fire occurring in a cargo compartment of the aircraft, halon, which is an inert gas (halon may refer to Haloalkane, or halogenoalkane, a group of compounds consisting of alkanes with linked halogens) may be directed into the cargo compartment to suppress the fire. Halon may be harmful to the atmosphere and thus may be undesirable for use.

SUMMARY

Described herein is a system for providing supplemental power and fire suppression on an aircraft. The system includes a turbo pump configured to convert a compressed gas into at least one of electrical power, hydraulic power, or pneumatic power. The system also includes a storage tank configured to store the compressed gas. The system also includes a fire suppression control valve configured to be coupled between the storage tank and a cargo compartment of the aircraft and having a suppression closed position in which the compressed gas is prevented from flowing to the cargo compartment and a suppression open position in which the compressed gas flows through the fire suppression control valve to the cargo compartment to suppress a fire. The system also includes a pump control valve configured to be coupled between the turbo pump and the storage tank and having a pump closed position in which the compressed gas is prevented from flowing to the turbo pump and a pump open position in which the compressed gas flows through the pump control valve to the turbo pump to cause the turbo pump to convert the compressed gas into the at least one of the electrical power, the hydraulic power, or the pneumatic power.

Any of the foregoing embodiments may also include a controller coupled to the fire suppression control valve and the pump control valve and configured to control the fire suppression control valve to change from the suppression closed position to the suppression open position in response to determining that the fire exists in the cargo compartment, and to control the pump control valve to be in the pump open position in response to determining that the aircraft lacks power.

In any of the foregoing embodiments, the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position.

Any of the foregoing embodiments may also include a turbine exhaust selector valve located between the turbo pump and the cargo compartment and having an overboard position in which exhaust from the compressed gas used by the turbo pump is directed out of the aircraft, and a cargo position in which the exhaust from the compressed gas used by the turbo pump is directed into the cargo compartment to suppress the fire.

Any of the foregoing embodiments may also include a controller coupled to the turbine exhaust selector valve and configured to control the turbine exhaust selector valve to switch from the overboard position to the cargo position in response to determining that the fire exists in the cargo compartment.

In any of the foregoing embodiments, the compressed gas includes compressed helium.

In any of the foregoing embodiments, the storage tank includes at least one storage tank and is configured to store a sufficient quantity of compressed gas for the turbo pump to provide at least 20 kilowatts of electrical power for at least half of an hour.

Any of the foregoing embodiments may also include an input device configured to receive user input corresponding to a desired position of at least one of the fire suppression control valve or the pump control valve, and a controller coupled to the at least one of the fire suppression control valve or the pump control valve and configured to cause the at least one of the fire suppression control valve or the pump control valve to have the desired position based on the user input.

Also disclosed is an aircraft. The aircraft includes a cargo compartment. The aircraft also includes a turbo pump configured to convert a compressed gas into at least one of electrical power, hydraulic power, or pneumatic power. The aircraft also includes a storage tank configured to store the compressed gas. The aircraft also includes a fire suppression control valve configured to be coupled between the storage tank and the cargo compartment and having a suppression closed position in which the compressed gas is prevented from flowing to the cargo compartment and a suppression open position in which the compressed gas flows through the fire suppression control valve to the cargo compartment to suppress a fire. The aircraft also includes a pump control valve configured to be coupled between the turbo pump and the storage tank and having a pump closed position in which the compressed gas is prevented from flowing to the turbo pump and a pump open position in which the compressed gas flows through the pump control valve to the turbo pump to cause the turbo pump to convert the compressed gas into the at least one of the electrical power, the hydraulic power, or the pneumatic power.

Any of the foregoing embodiments may also include a controller coupled to the fire suppression control valve and the pump control valve and configured to control the fire suppression control valve to change from the suppression closed position to the suppression open position in response to determining that the fire exists in the cargo compartment, and to control the pump control valve to be in the pump open position in response to determining that the aircraft lacks power.

In any of the foregoing embodiments, the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position.

Any of the foregoing embodiments may also include a turbine exhaust selector valve located between the turbo pump and the cargo compartment and having an overboard position in which exhaust from the compressed gas used by the turbo pump is directed out of the aircraft, and a cargo position in which the exhaust from the compressed gas used by the turbo pump is directed into the cargo compartment to suppress the fire.

Any of the foregoing embodiments may also include a controller coupled to the turbine exhaust selector valve and configured to control the turbine exhaust selector valve to switch from the overboard position to the cargo position in response to determining that the fire exists in the cargo compartment.

In any of the foregoing embodiments, the compressed gas includes compressed helium.

In any of the foregoing embodiments, the storage tank includes at least one storage tank and is configured to store a sufficient quantity of compressed gas for the turbo pump to provide at least 20 kilowatts of power for at least half of an hour.

Any of the foregoing embodiments may also include an input device configured to receive user input corresponding to a desired position of at least one of the fire suppression control valve or the pump control valve, and a controller coupled to the at least one of the fire suppression control valve or the pump control valve and configured to cause the at least one of the fire suppression control valve or the pump control valve to have the desired position based on the user input.

Also disclosed is a method for providing supplemental power and fire suppression on an aircraft. The method includes identifying, by a controller, at least one of: a fire condition in which a fire is present in a cargo compartment of the aircraft, or a power condition when the aircraft has lost power. The method also includes controlling, by the controller, a fire suppression control valve to switch from a suppression closed position in which compressed gas stored in a storage tank is prevented from flowing to the cargo compartment to a suppression open position in which the compressed gas flows through the fire suppression control valve to the cargo compartment to suppress the fire in response to identifying the fire condition. The method also includes controlling, by the controller, a pump control valve to switch from a pump closed position in which the compressed gas is prevented from flowing to a turbo pump to a pump open position in which the compressed gas flows through the pump control valve to the turbo pump to cause the turbo pump to convert the compressed gas into at least one of electrical power, hydraulic power, or pneumatic power in response to identifying the power condition.

Any of the foregoing embodiments may also include controlling, by the controller, the fire suppression control valve to change from the suppression open position to a suppression partially open position in which the compressed gas may flow to the cargo compartment at a slower rate than in the suppression open position a predetermined amount of time after controlling the fire suppression control valve from the suppression closed position to the suppression open position.

Any of the foregoing embodiments may also include controlling, by the controller, a turbine exhaust selector valve to switch from an overboard position in which exhaust from the compressed gas used by the turbo pump is directed out of the aircraft to a cargo position in which the exhaust from the compressed gas used by the turbo pump is directed into the cargo compartment to suppress the fire in response to identifying the fire condition and the power condition.

Any of the foregoing embodiments may also include receiving, by an input device, user input corresponding to a desired position of at least one of the fire suppression control valve or the pump control valve; and controlling, by the controller, the at least one of the fire suppression control valve or the pump control valve to have the desired position based on the user input.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
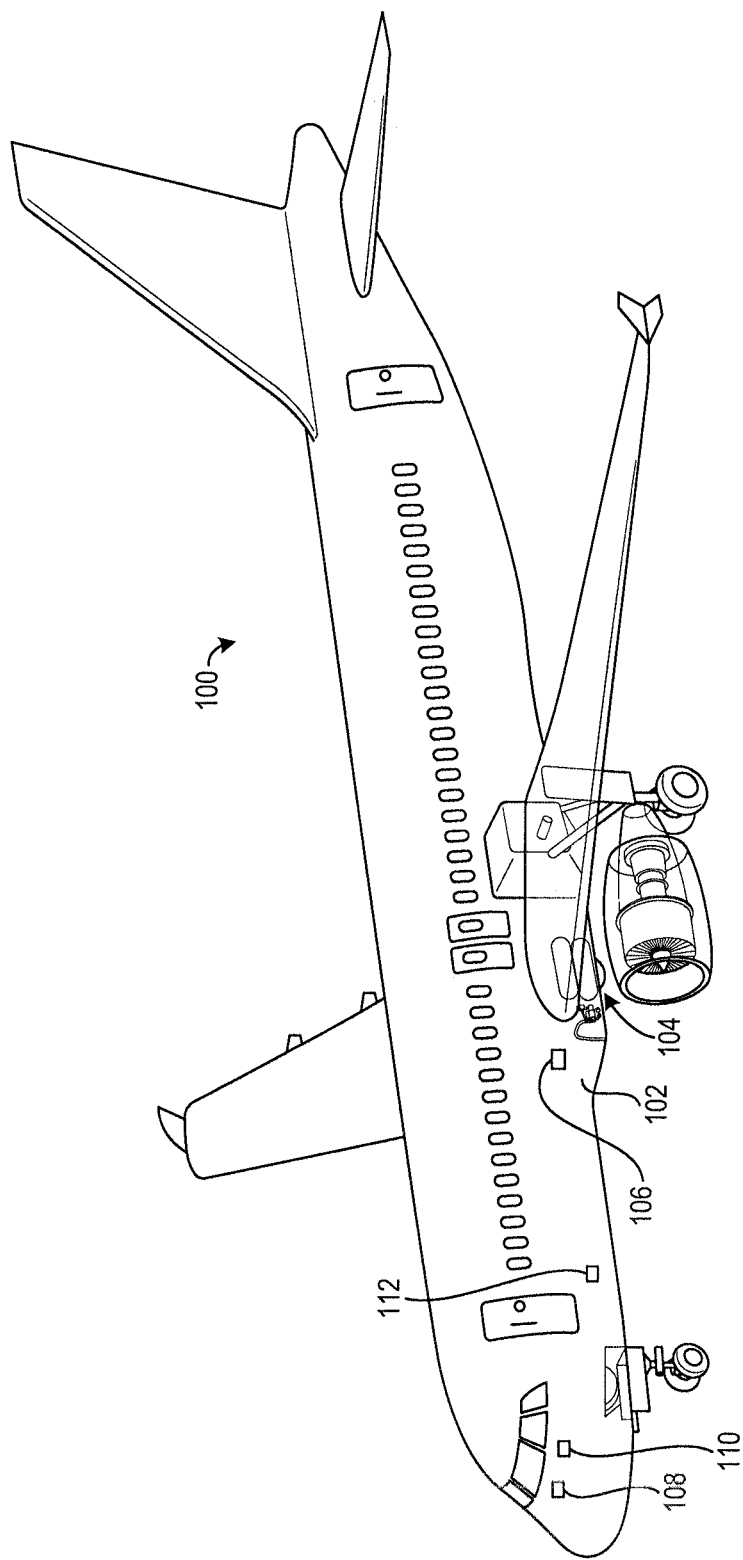
FIG. 1 is a drawing of an aircraft having a system for providing supplemental power and fire suppression, in accordance with various embodiments of the present disclosure.

Referring to FIG. 1, an aircraft 100 includes a cargo compartment 102 in which cargo may be stored. The aircraft 100 may further include a system 104 for providing supplemental power to various components of the aircraft 100 and for providing fire suppression to the cargo compartment 102. The system 104 may be used to provide the functionality that is provided by both ram air turbines (RATs) and halon fire suppression systems. The system 104 may include a controller 106, an input device 108, an electrical sensor 110, and a fire sensor 112.

The controller 106 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 106 may further include any non-transitory memory known in the art. The memory may store instructions usable by the logic device to perform operations as described herein.

The input device 108 may include any input device capable of receiving user input, such as a keyboard, a joystick, a mouse, a microphone, or the like.

The electrical sensor 110 may include any sensor capable of detecting electrical power, hydraulic power, or pneumatic power. For example, the electrical sensor 110 may include a voltage sensor, a current sensor, a pressure sensor, or the like.

The fire sensor 112 may be located in the cargo compartment 102 and may include any sensor capable of detecting a fire, such as a flame detector (e.g., an infrared flame detector), a smoke detector, or the like.

The controller 106 may identify a power condition based on data received from the electrical sensor 110. For example, if the electrical sensor 110 detects a lack of electrical or hydraulic power in a portion of the aircraft 100, then the controller 106 may identify the power condition.

The controller 106 may identify a fire condition in the cargo compartment 102 based on data received from the fire sensor 112. For example, if the fire sensor 112 detects the presence of a fire in the cargo compartment 102, then the controller 106 may identify the fire condition.

The controller 106 may control various aspects of the system 104 to provide supplemental power or to suppress a fire in response to identifying at least one of the fire condition or the power condition.

Figure 2:
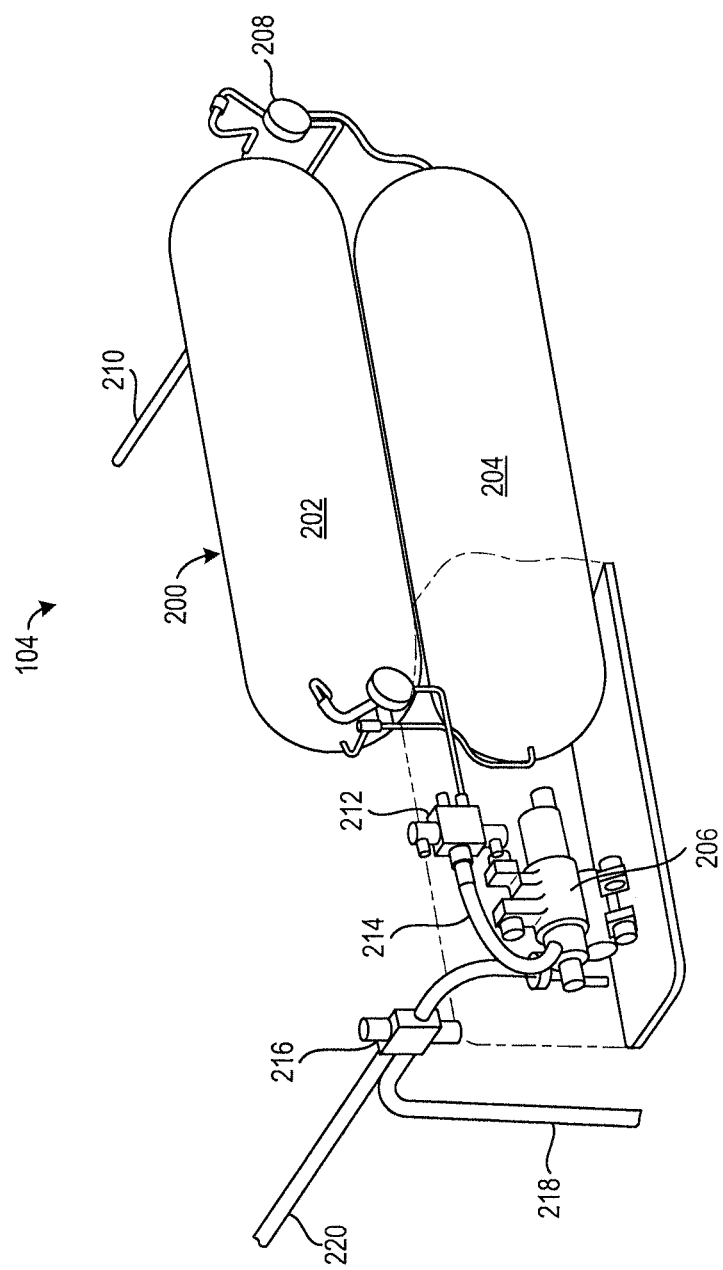
FIG. 2 illustrates the system for providing supplemental power and fire suppression of the aircraft of FIG. 1, in accordance with various embodiments of the present disclosure.

Turning now to FIG. 2, additional details of the system 104 are shown. In particular, the system 104 may include one or more storage tank 200 including a first storage tank 202 and a second storage tank 204. In various embodiments, the storage tanks 200 may include a single storage tank, or may include any quantity of storage tanks. The storage tanks 200 may be designed to store a compressed gas, such as helium, nitrogen, hydrogen, or the like. In various embodiments, the storage tanks 200 may be designed to store a compressed inert gas. In various embodiments, the storage tanks 200 together may be capable of storing a 90 pound-mass of helium. The 90 pound-mass of helium may be stored at 10,000 pounds per square inch (68.9 Megapascal) in two storage tanks that are each 16 inches (41 centimeters) in diameter and 44 inches (112 cm) in length, though other storage tank dimensions are contemplated herein. In various embodiments, the storage tanks 200 may include multiple spherical tanks that may be capable of storing gas at a higher pressure than cylindrical tanks.

The system 104 may further include a turbo pump 206. The turbo pump 206 is designed to convert compressed gas (i.e., pneumatic energy) into one or more of electrical power, hydraulic power, or pneumatic power. In that regard, the turbo pump 206 may function as a turbine. In various embodiments, the turbo pump 206 may include a turbine. The electrical power, the hydraulic power, or the pneumatic power may be converted into a different form of energy by other subsystems of the aircraft, such as motor pumps, motor compressors, or the like.

The turbo pump 206 may have dimensions that are significantly less than those of a conventional ram air turbine. In that regard, use of the turbo pump 206 may be desirable over use of a ram air turbine.

The system 104 may further include a fire suppression control valve 208. Referring to FIGS. 1 and 2, the fire suppression control valve 208 may be located between the storage tanks 200 and the cargo compartment 102. The fire suppression control valve 208 may have a suppression closed position in which the compressed gas may fail to flow through the fire suppression control valve 208. The fire suppression control valve 208 may further have a suppression open position in which the compressed gas may flow through the fire suppression control valve 208 and through a suppression line 210 to the cargo compartment 102.

The fire suppression control valve 208 may further have a suppression partially open position. The compressed gas may flow through the fire suppression control valve 208 to the cargo compartment 102 at a slower rate in response to the fire suppression control valve 208 being in the suppression partially open position than in response to the fire suppression control valve 208 being in the suppression open position.

In response to identifying a fire condition, the controller 106 may control the fire suppression control valve 208 to be in the suppression open position to allow a relatively large volume of gas to flow into the cargo compartment 102 from the storage tanks 200 to suppress the fire. This transfer of gas from the storage tanks 200 to the cargo compartment 102 may be referred to as an initial fire knockdown. For example, 1,300 cubic feet (36.8 cubic meters) of atmospheric pressure of the gas may be initially provided to the cargo compartment 102 during the initial fire knockdown. This may correspond to a 50 percent (50%) purge ratio.

After expiration of a predetermined period of time, the controller 106 may control the fire suppression control valve 208 to be in the suppression partially open position to continue providing the inert gas to the cargo compartment 102 at a slower rate. This may be referred to as a low rate discharge (LRD) fire suppression phase. In various embodiments, assuming an aircraft leakage rate of 1000 cubic feet (28.3 cubic meters) per hour, the storage tanks 200 may include a sufficient quantity of compressed gas to provide the initial fire knockdown along with approximately 8 hours of LRD fire suppression. Where used in this context, the term "approximately" refers to the stated value plus or minus 10% of the stated value.

The system 104 may further include a pump control valve 212. The pump control valve 212 may be coupled between the storage tanks 200 and the turbo pump 206. The pump control valve 212 may have a pump closed position in which the compressed gas is prevented from flowing from the storage tanks 200 to the turbo pump 206. The pump control valve 212 may further have a pump open position in which the compressed gas flows from the storage tanks 200 to the turbo pump 206 via a pump line 214.

In response to determining the power condition, the controller 106 may control the pump control valve 212 to be in the pump open position to allow the compressed gas to flow from the storage tanks 200 to the turbo pump 206. In response to receiving the compressed gas, the turbo pump 206 may generate one or more of electricity, hydraulic power, or pneumatic power. In various embodiments, the turbo pump 206 may be controlled by the controller 106 to generate one or more of the electrical power, the hydraulic power, or the pneumatic power based on data detected by the electrical sensor 110.

The storage tanks 200 may store a sufficient amount of compressed gas for the turbo pump 206 to provide an average of 20 Kilowatts of power for at least half of an hour. This may be a sufficient amount of power to safely land the aircraft 100 in response to failure of all engines of the aircraft 100.

The system 104 may further include a turbine exhaust selector valve 216. The turbine exhaust selector valve 216 may receive exhaust from the turbo pump 206 that corresponds to the compressed gas used by the turbo pump 206. The turbine exhaust selector valve 216 may have an overboard position in which the exhaust is directed out of the aircraft 100 via an overboard line 218. The turbine exhaust selector valve 216 may further have a cargo position in which the exhaust is directed into the cargo compartment 102 via a cargo line 220. The controller 106 may control the turbine exhaust selector valve 216 to be in the overboard position in response to identifying the power condition and identifying a lack of a fire condition, and may control the turbine exhaust selector valve 216 to be in the cargo position in response to identifying the power condition and the fire condition.

In various embodiments, in response to identifying the power condition and the fire condition, the controller 106 may control the fire suppression control valve 208 to be in the suppression open position to provide the fire knockdown and may simultaneously control the pump control valve 212 to be in the pump open position to allow the compressed gas to power the turbo pump 206. The controller 106 may further control the turbine exhaust selector valve 216 to be in the cargo position to allow the inert exhaust to flow to the cargo compartment 102. After the fire knockdown phase, the controller 106 may control the fire suppression control valve 208 to be in the suppression off position, such that the LRD fire suppression is provided to the cargo compartment 102 via the cargo line 220 to reduce waste of the compressed gas.

In various embodiments, one or more of the fire suppression control valve 208, the pump control valve 212, or the turbine exhaust selector valve 216 may be operated or controlled manually in addition to, or instead of, being controlled by the controller 106. In various embodiments, the input device 108 may receive a desired position of one or more of the fire suppression control valve 208, the pump control valve 212, or the turbine exhaust selector valve 216, and the controller 106 may control the one or more of the fire suppression control valve 208, the pump control valve 212, or the turbine exhaust selector valve 216 to be in the desired position based on the user input.

Figure 3:
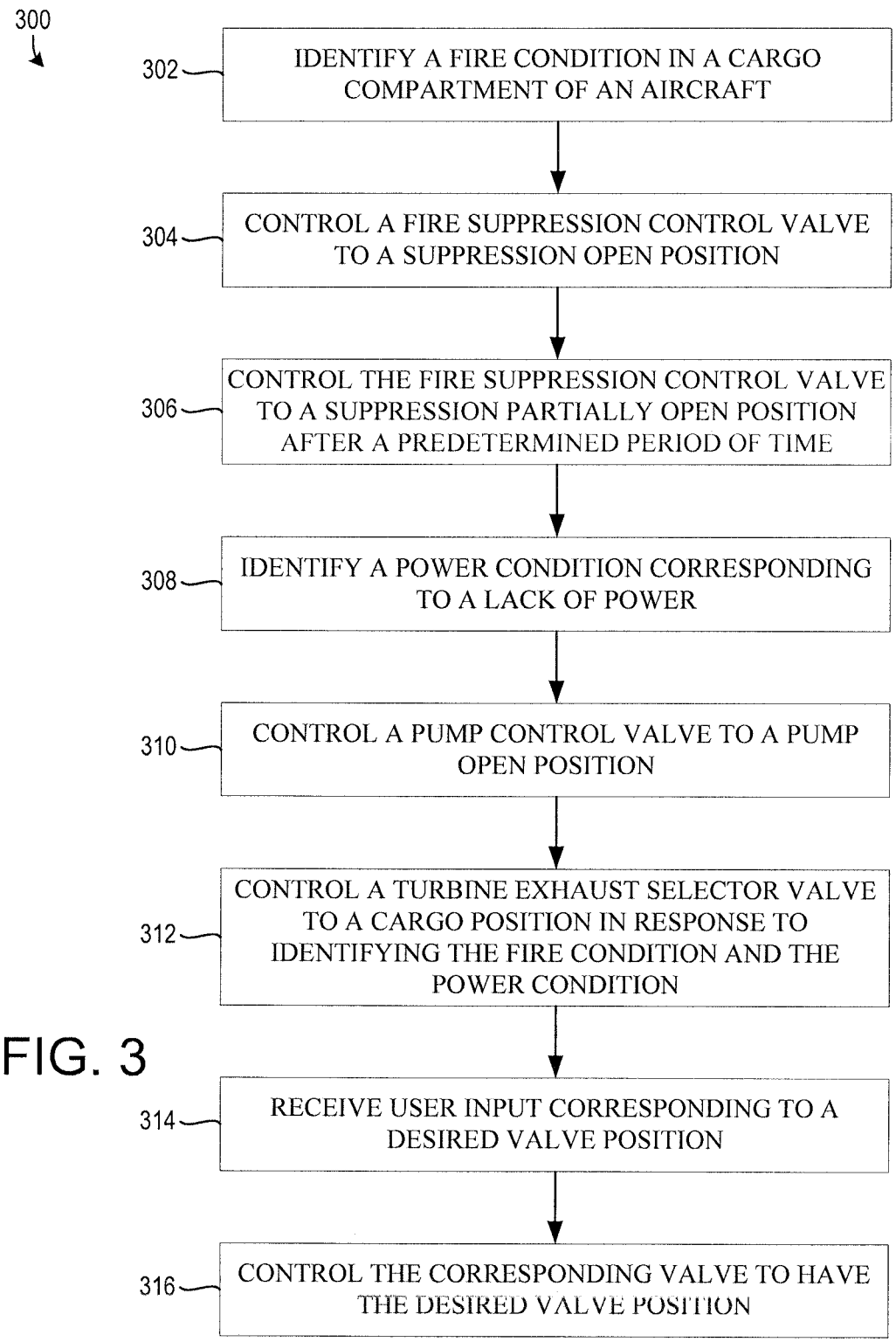
FIG. 3 is a flowchart illustrating a method for providing supplemental power and fire suppression to an aircraft, in accordance with various embodiments of the present disclosure.

Referring now to FIG. 3, a method 300 for providing supplemental power and fire suppression to an aircraft is shown. The method 300 may be performed by a system similar to the system 104 of FIGS. 1 and 2. For example, the method 300 may be performed by a controller similar to the controller 106 of FIG. 1.

In block 302, the controller may receive fire data from a fire sensor and may identify a fire condition in a cargo compartment of an aircraft based on the fire data. For example, if the fire data indicates that the fire is present in the cargo compartment, then the controller may identify the fire condition.

In block 304, the controller may control a fire suppression control valve to change from a suppression closed position in which compressed gas is prevented from flowing from a storage tank to the cargo compartment to a suppression open position to allow the compressed (inert) gas to flow from the storage tank to the cargo compartment to provide an initial fire knockdown. The controller may control the fire suppression control valve to change to the suppression open position in response to identifying the fire condition.

In block 306, the controller may control the fire suppression control valve to change from the suppression open position to a suppression partially open position after a predetermined period of time corresponding to the fire knockdown phase has expired. The fire suppression control valve may provide LRD fire suppression in response to being in the suppression partially open position.

In block 308, the controller may receive detected power data from an electrical sensor of the aircraft, and may identify a power condition based on the detected power data. For example, the controller may identify the power condition in response to the power data indicating that the aircraft has lost power (such as at least one of electrical power or hydraulic power).

In block 310, the controller may control a pump control valve to be in a pump open position to allow the compressed gas from the storage tank to flow to a turbo pump. In that regard, the compressed gas may be used by the turbo pump to generate at least one of the electrical power, the hydraulic power, or the pneumatic power to supplement the power that was lost in the power condition.

In various embodiments, the controller may identify whether electrical or hydraulic power was lost, and may control the turbo pump to provide the type of power that was lost. In various embodiments, the controller may control the turbo pump to provide any one or more of electrical power, hydraulic power, or pneumatic power, and may control a secondary component to convert one or more of the types of power into a different type of power.

In block 312, in response to identifying both the fire condition and the power condition, the controller may control a turbine exhaust selector valve to be in a cargo position to allow exhaust from the turbo pump flow into the cargo compartment. In that regard, the exhaust from the turbo pump may provide LRD fire suppression to the cargo compartment, as the exhaust from the turbo pump may be inert.

In block 314, the controller may receive user input from an input device that corresponds to a desired valve position of one or more of the fire suppression control valve, the pump control valve, or the turbine exhaust selector valve.

In block 316, the controller may control the corresponding one or more of the fire suppression control valve, the pump control valve, or the turbine exhaust selector valve to have the desired valve position. In various embodiments, the user input may override any decision made by the controller regarding valve position. For example, if the controller identifies a lack of a fire condition, a user may still control the fire suppression control valve to be in a suppression open position by selecting the suppression open position as the desired position using the input device.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for providing supplemental power and fire suppression on an aircraft, comprising:
   a turbine configured to convert a compressed gas into at least one of electrical power, hydraulic power, or pneumatic power, the compressed gas including a nitrogen or a helium;
   a storage tank configured to store the compressed gas;
   a fire suppression control valve configured to be coupled between the storage tank and a cargo compartment of the aircraft and having a suppression closed position in which the compressed gas is prevented from flowing to the cargo compartment and a suppression open position in which the compressed gas flows through the fire suppression control valve to the cargo compartment to suppress a fire;
   a pump control valve configured to be coupled between the turbine and the storage tank and having a pump closed position in which the compressed gas is prevented from flowing to the turbine and a pump open position in which the compressed gas flows through the pump control valve to the turbine to cause the turbine to convert the compressed gas into the at least one of the electrical power, the hydraulic power, or the pneumatic power; and
   a turbine exhaust selector valve having an inlet configured to receive exhaust from the turbine, a first outlet configured to port the exhaust from the turbine out of the aircraft, and a second outlet configured to port the exhaust into the cargo compartment to suppress the fire and having an overboard position in which the exhaust flows through the first outlet out of the aircraft, and a cargo position in which the exhaust flows through the second outlet into the cargo compartment to suppress the fire,
   wherein the storage tank is configured to be upstream from the cargo compartment and the turbine simultaneously.

2. The system of claim 1, further comprising a controller coupled to the fire suppression control valve and the pump control valve and configured to control the fire suppression control valve to change from the suppression closed position to the suppression open position in response to determining that the fire exists in the cargo compartment, and to control the pump control valve to be in the pump open position in response to determining that the aircraft lost power.

3. The system of claim 2, wherein the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position.

4. The system of claim 1, further comprising a controller coupled to the turbine exhaust selector valve and configured to control the turbine exhaust selector valve to switch from the overboard position to the cargo position in response to determining that the fire exists in the cargo compartment.

5. The system of claim 1, wherein the compressed gas includes compressed helium.

6. The system of claim 1, wherein the storage tank includes at least one storage tank and is configured to store a sufficient quantity of compressed gas for the turbine to provide at least 20 kilowatts of electrical power for at least half of an hour.

7. The system of claim 1, further comprising an input device configured to receive user input corresponding to a desired position of at least one of the fire suppression control valve or the pump control valve, and a controller coupled to the at least one of the fire suppression control valve or the pump control valve and configured to cause the at least one of the fire suppression control valve or the pump control valve to have the desired position based on the user input.

8. An aircraft, comprising:
   a cargo compartment;
   a turbine configured to convert a compressed gas into at least one of electrical power, hydraulic power, or pneumatic power, the compressed gas including a nitrogen or a helium;
   a storage tank configured to store the compressed gas;
   a fire suppression control valve configured to be coupled between the storage tank and the cargo compartment and having a suppression closed position in which the compressed gas is prevented from flowing to the cargo compartment and a suppression open position in which the compressed gas flows through the fire suppression control valve to the cargo compartment to suppress a fire;

a pump control valve configured to be coupled between the turbine and the storage tank and having a pump closed position in which the compressed gas is prevented from flowing to the turbine and a pump open position in which the compressed gas flows through the pump control valve to the turbine to cause the turbine to convert the compressed gas into the at least one of the electrical power, the hydraulic power, or the pneumatic power; and a turbine exhaust selector valve having an inlet configured to receive exhaust from the turbine, a first outlet configured to port the exhaust from the turbine out of the aircraft, and a second outlet configured to port the exhaust into the cargo compartment to suppress the fire and having an overboard position in which the exhaust flows through the first outlet out of the aircraft, and a cargo position in which the exhaust flows through the second outlet into the cargo compartment to suppress the fire, wherein the storage tank is configured to be upstream from the cargo compartment and the turbine simultaneously.

9. The aircraft of claim 8, further comprising a controller coupled to the fire suppression control valve and the pump control valve and configured to control the fire suppression control valve to change from the suppression closed position to the suppression open position in response to determining that the fire exists in the cargo compartment, and to control the pump control valve to be in the pump open position in response to determining that the aircraft lacks power.

10. The aircraft of claim 9, wherein the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position.

11. The aircraft of claim 8, further comprising a controller coupled to the turbine exhaust selector valve and configured to control the turbine exhaust selector valve to switch from the overboard position to the cargo position in response to determining that the fire exists in the cargo compartment.

12. The aircraft of claim 8, wherein the compressed gas includes compressed helium.

13. The aircraft of claim 8, wherein the storage tank includes at least one storage tank and is configured to store a sufficient quantity of compressed gas for the turbine to provide at least 20 kilowatts of power for at least half of an hour.

14. The aircraft of claim 8, further comprising an input device configured to receive user input corresponding to a desired position of at least one of the fire suppression control valve or the pump control valve, and a controller coupled to the at least one of the fire suppression control valve or the pump control valve and configured to cause the at least one of the fire suppression control valve or the pump control valve to have the desired position based on the user input.

* * * * *